TELEPHONE INSTRUMENT CONTROLLING DEVICE

Filed March 3, 1960

2 Sheets-Sheet 1

INVENTOR.
MILTON L. SNOW

BY

ATTORNEY

April 20, 1965 M. L. SNOW 3,179,749

TELEPHONE INSTRUMENT CONTROLLING DEVICE

Filed March 3, 1960 2 Sheets-Sheet 2

INVENTOR.
MILTON L. SNOW

BY [signature]

ATTORNEY

3,179,749
TELEPHONE INSTRUMENT CONTROLLING DEVICE

Milton L. Snow, 401 Broadway, New York 13, N.Y.
Filed Mar. 3, 1960, Ser. No. 12,609
16 Claims. (Cl. 179—1)

The present invention relates to apparatus or devices for facilitating the use of a telephone instrument by enabling the user to manipulate and control the instrument, both the dialing mechanism and the receiving and transmitting means thereof, at a distance from the user, in a manner to allow the user free usable space on a desk or table, immediately in front of him, and also leaving the user free use of the hands for whatever purpose it may be necessary.

The present invention is an extension and improvement of my co-pending application, filed February 13, 1958, Serial No. 715,056, now Pat. No. 2,961,498. In the device of my co-pending application, the handpiece of a telephone set, incorporating both the receiving and transmitting mechanisms of the telephone, is removably supported at the end of an arm that is adjustable to bring it in operating position adjacent the user's ear and mouth; and the base on the instrument, which mounts the dialing mechanism and the controlling switch, is rested on or adjacent to a base on which is reciprocably supported a horizontally disposed bar for vertical reciprocation to move it in and out of contact with the switch pins controlling the switch of the instrument. Such bar-supporting means is manipulated by a lever that extends forwardly of the instrument base and is manually operable to either move the control bar into switch-opening or switch-closing position by either lowering or raising its forward end. Such lever is releasable to automatic return to the other of the two positions.

The present invention is directed to the provision, with apparatus or devices of the character described, of sound amplifying means that are automatically activated and de-activated by the movement of the switch control lever into switch-closing and switch-opening position.

It is also an object of the present invention to provide telephone control apparatus of the character described which is provided with sound amplifying means that will amplify both received and transmitted sounds, to thereby further free the user from maintaining himself in close proximity to the telephone instrument, and permit him greater leeway in the movement of his head as well as his hands in the course of his use of the telephone instrument.

It is another object of the present invention to provide telephone instrument manipulating apparatus of the character described having sound-amplifying means in which the feed-back of sounds from receiver to transmitter, such as frequently causes whistling or other various noises in telephone or like instruments that have associated electronic sound-amplifying means, is eliminated.

It is still another object of the present invention to provide telephone control apparatus of the character described having sound-amplifying means associated with and combined in a sturdy, compact unit that occupies a minimum of space.

It is yet another object of the present invention to provide a telephone control unit of the character described which is not only compact and non-encumbering, but may readily be made in ornamental form so as to be decorative and enhance the appearance of a surface on which it is used.

It is a further object of the present invention to provide units of the character described in which the handpiece support is in mechanical association with the base-supporting unit of the telephone, and is adjustable thereon for greater and closer proximity to the user and for convenient use by either right-handed or left-handed persons.

It is a still further object of the present invention to provide clasp means for supporting the handpiece of the telephone instrument safely against displacement and against scratching, and which may conveniently, easily and rapidly be manipulated with one hand, both for disposal of the handpiece thereon and for its removal therefrom.

It is a yet further object of the present invention to provide a telephone control unit of the character described which is of relatively simple and economical construction, and which may be used with maximum ease and convenience.

The foregoing and other objects and advantages of the telephone instrument controlling device of the present invention will become more readily apparent to those skilled in the art from the embodiment thereof shown in the accompanying drawings, and from the description following. It is to be understood, however, that such embodiment is shown by way of illustration only, to make the principles and practice of the invention more readily comprehensible, and without any intent of limiting the invention to the specific details therein shown.

Figures 1, 2, 5:
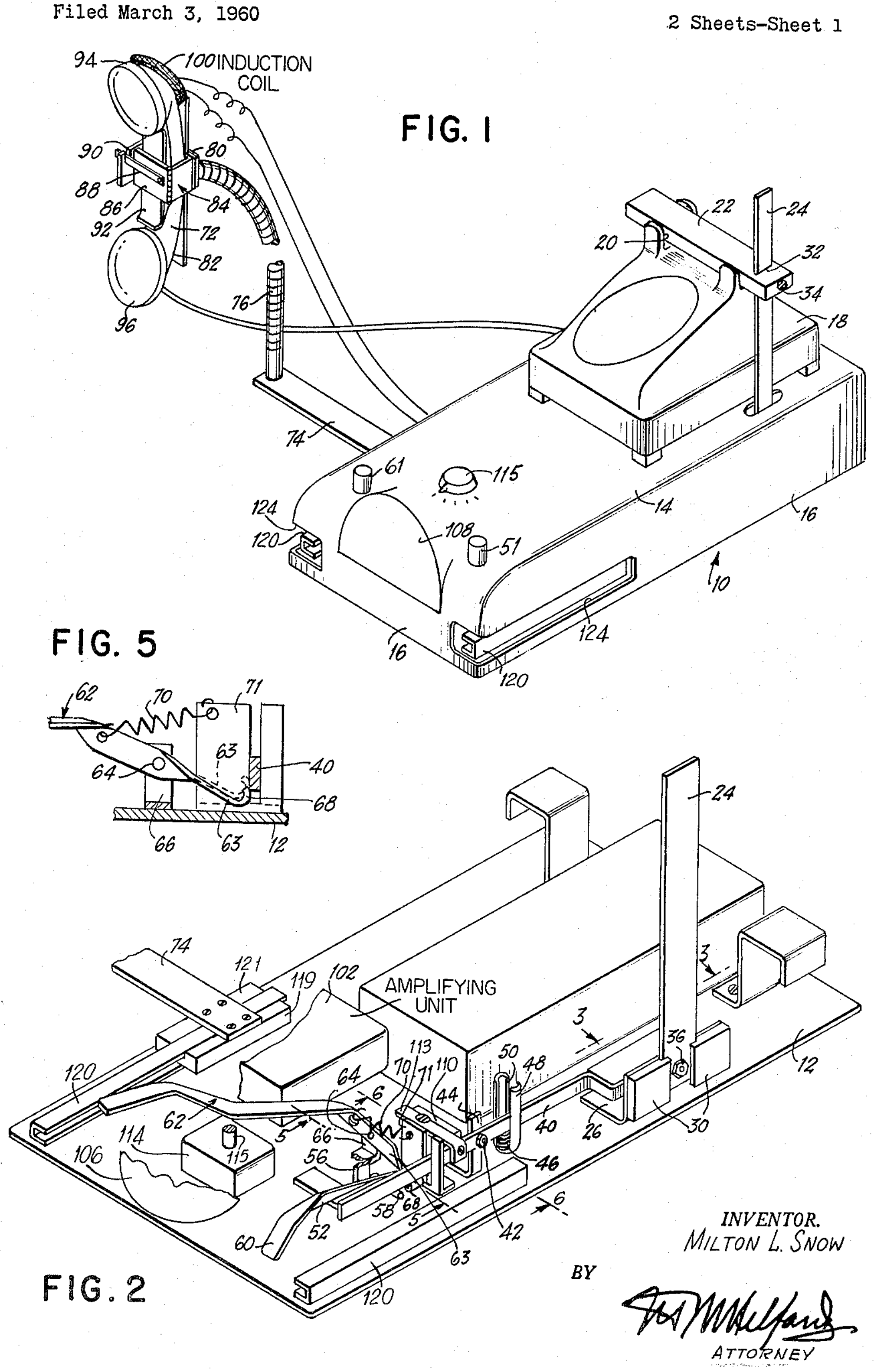
FIG. 1 is a perspective view of one embodiment of a telephone instrument controlling device of the present invention, with the handpiece support thereof foreshortened.
FIG. 2 is a perspective view of the same, with the telephone instrument platform cover removed, and partly broken away, to show details of construction.
FIG. 5 is a section taken on line 5—5 of FIG. 2.

Generally stated, the present invention resides in the provision of a telephone instrument controlling device or unit which consists of a combination that includes a stand and support for the handpiece of the device, which also supports an induction coil connected to an electronic amplifier, in position to affect and to be affected by sounds entering and leaving the handpiece; and of means for manipulating the switch in the base of the telephone which includes a member vertically reciprocable over the switch pins of the telephone base to depress and release them, a lever operably connected to such member and a normally open switch connected in the circuit of the sound amplifier that is closed and opened by the lever when the latter is moved into position for closing and opening the switch through the telephone base.

Referring now in greater detail to the embodiment of the invention illustrated in the drawing, the same is shown to comprise an elongated, preferably rectangular, relatively low, hollow stand, generally designated as 10, which may be formed of any material or combination of materials suitable for the purpose. The stand 10 comprises a base plate, 12, adapted to rest on a surface, and a top wall or platform, 14, supported in spaced relation to the base, and upright wall section, 16, which may preferably be formed integrally with the platform 14.

Disposed on the platform 14, at one end thereof, is the base unit, 18, of a telephone instrument of the standard type provided with a cradle, 20, into which project the switch buttons that are normally spring tensed into position to close the circuit through the instrument and are depressible by a telephone instrument handpiece disposed in the cradle 20, on top of buttons to break the circuit through the instrument.

In accordance with the invention of my said co-pending application, substitute means in place of the handpiece, for opening and closing the circuit through the telephone base 18 are provided. Either of the two forms of such means illustrated in my said co-pending application may be utilized, or any modifications thereof. In the illustrated embodiment, I utilize a pin-manipulating bar, 22, which is secured by one end to an upright bar, 24, that is guided at its lower end, for vertical reciprocation between an angle bar, 26, secured to the base plate 12 of the stand, and which is vertically slotted, as at 28, and a pair of spaced plates, 30, secured on the upright leg of said angle bar 26, on the exterior thereof, in spaced relation thereto, to form a guideway. The bar 22 may be vertically, adjustably supported on the bar 24 by a slot, 32, formed at one end thereof, which fits over bar 24, and by a screw, 34, set into the end edge of the bar 22 that is engageable against the bar 24.

The upright bar 24 is connected by a bolt or screw, 36, engaging its lower end and passing through the vertical guide slot, 28, to one end of a lever, 40, which is pivoted intermediate its ends, as at 42, on a post, 44, mounted on the base plate 12. The pin or screw 36 engages the inner or rear end of the lever 40 in an elongated slot, 45, formed therein, to permit vertical reciprocation of the lever end without lateral displacement of the connecting bolt 36.

The pin-connected or rear end of the lever 40 is normally supported in elevated position by a coil spring, 46, which underlies it and which is housed in the lower portion of a sleeve, 48, mounted on the base plate 12, and which is slotted, as at 50, to serve, simultaneously, as a guide and support for the lever 40 against lateral stresses. By this arrangement, the bar-supporting end of the lever 40 is normally supported in elevated position with the transverse, switch-pin-engaging bar 22 likewise in elevated position, to permit the switch through the instrument to assume its normally spring-tensed, circuit-closing position.

In order to depress the bars 22 and 24, to bring the former down upon the pins and break the circuit through the instrument, I mount a second lever, 52, which is pivoted intermediate its ends, on a post, 56, supported on the plate 12, adjacent the forward end of the lever 40. The lever 52 is provided at its inner end with a laterally-extending bar or pin, 58, which underlies the forward end of the lever 40 and normally maintains the lever 52 in diagonal position with its pin-carrying end depressed and its other or finger end in elevated position, and preferably horizontally offset to serve as a fingerpiece, 60, which, upon depression, lifts, by pins 58, the forward end of the lever 40 to depress the bar 22 on the telephone switch pins, to break the circuit through the telephone base 12.

In order to maintain the telephone instrument switch inactivated, by maintaining the rear end of lever 40 in depressed position and its forward end in raised position, I provide a control lever, 62, pivoted intermediate its ends, as at 64, on a post, 66, secured to the bottom plate of the base 12 in close proximity to the forward end of the lever 40. The arm, 63, of the lever 62 between its pivot post 66 and the forward end of the lever 40, is formed with an upwardly-bent portion, 68, that bears against the lever 42 when said arm is in depressed position, in which it is normally held by a tension spring, 70, anchored by one end on a post, 71, and by its other end to the other arm of the lever 62. The lever 62 is so arranged that the end of the arm 63 will underlie the forward end of the lever 40 when it is in elevated position, raised thereto by the pin 58, to maintain such forward end in elevated position, and the horizontal bar 22 in switch-pin-depressing position. In order to release the forward end of the lever 40 to permit it to assume its normally depressed position, the arm 65 of the lever 62 is depressed to disengage the end of its other arm 63 from under the forward end of the lever 40 and permit the latter to return to its normal position.

The device of the present invention also provides means for supporting the handpiece, 72, of the telephone set, which are preferably integrated with the platform 10. Such means comprises a horizontally-disposed bar, 74, one end of which is adjustably secured to the base plate 12 of the platform 10, in any one of a number of ways, some of which are hereafter described in detail. The other end of the bar 74 supports a preferably gooseneck arm, 76, the end of which carries a universal joint to which may be secured, in normal relation thereto, a plate, 80. The plate 80 carries, in secured relation, by approximately its center, an elongated bar, 82, adapted to serve as a rest for the stem portion of the handpiece 72. The rest bar 82 may be suitably curved to fit the curvature of such handpiece stem portion.

The plate 80 also supports, by its web, a U-shaped bracket, 84, whose side walls extend outwardly, one to each side of the rest bar 82, to a height to accommodate the thickness of the stem of the handpiece 72. One of the bracket legs carries, in hinged relation at its outer edge, a lock bar, 86, on the exterior of which is pivotally secured a latch member, 88, that is engageable in a slot, 90, formed in the other of the leg members of the bracket and opening into a side edge thereof.

Means are provided for inhibiting the shifting of a handpiece 72 disposed within the bracket 84. Such means may comprise, as illustrated, a bar, 92, secured to the inner surface of the lock plate 86, of a length to fit substantially closely between the facing side portions of the receiving and transmitting sections, 94 and 96, respectively, of the handpiece 72, to limit the shifting of the handpiece on the rest plate 82. If desired, the same object may be accomplished by providing offset ends on the rest plate 82 that will engage against the outer face portions of such receiving and transmitting sections.

It will be apparent that the structure described above provides improved means for supporting the handpiece in place. Firstly, the handpiece is safely secured therein against shifting, tilting or dropping out. Secondly, it can be easily and quickly placed and removed in the supporting means by the use of one end, by the mere flipping of the latch member 88 into and out of the slot 90. Thirdly, the handpiece is held in the supporting means and placed and removed therein in a manner that will avoid damage thereto from scraping or scratching. It may here be stated that in the preferred position of the handpiece in the supporting means, the receiver section 94 of the handpiece is to be disposed to face the opening of the latch slot 90, and the latter disposed to open upwardly, to thereby ensure against inadvertent unlatching.

The device of the invention is provided with sound-amplifying means consisting of an induction element, 100, which is mounted on the handpiece-rest bar 82, preferably on the end thereof facing the opening of the latch slot 90. Such induction element 100 may preferably be in the form of a coil which is disposed at an angle to the plate 82, to project slightly above the same and to cradle the receiving section 94 of the handpiece. The induction coil 100 is connected to an electronic amplifying unit, 102, preferably of the transistor type, which is preferably housed within the platform 10. The amplifying unit 102 may be powered from any source but, in order to make the device a self-contained unit and completely portable, and to eliminate trailing wire, it may be powered from a dry cell battery, 104, which is similarly housed within the platform 10, with its terminals connected to the appropriate terminals of the amplifying unit 100.

The amplifying unit 102 is connected to a loudspeaker, 106, preferably of the magnetic type, which is preferably likewise supported within the platform 10, opposite a suitable opening, 108, therein, through which the amplified sound may emanate.

The device of the present invention preferably provides for the automatic activation of the amplifying means upon the closing of the main instrument switch in the telephone base 18. For that purpose, a normally open switch, 110, is supported on the base 12 of the platform, in position to be closed by the lever 40, or by any suitable appendage carried thereon, upon the movement of said lever into position of releasing the plate 22 from the switch buttons. In the illustrated embodiment, the switch 110 is shown to be mounted adjacent the forward end of the lever 40 and is of the type that is provided with a projecting button, 112, that is normally spring-tensed for closing the circuit therethrough and the forward end of the lever 40 is provided with a laterally-extending arm 113 that overhangs the switch button 112, to depress it into circuit-opening position when the forward end of the lever is in depressed position, to thereby break the circuit through the main telephone switch.

The amplifying circuit may also include a combined main switch and rheostat, 114, mounted to have its manipulating button, 115, extend to the exterior of the platform 10, whereby the amplifying circuit may be completely de-activated or controlled as to volume.

I have found that by mounting the induction element 100 in approximately the position described, there is attained not only amplification of the received sound through a loudspeaker; but also, due to a feed-back phenomenon, an appreciable amount of amplification of the transmitted sound is likewise attained. This amplification of the transmitted sound further removes limitation on the use of the telephone and enables the user to attain effective transmission of his voice without facing directly toward the transmitter end of the handpiece. This transmitting amplification attained is sufficient not only to permit the user to turn his face from the transmitter, but also to keep it at a relatively substantial distance therefrom and still attain ample transmitting volume.

This secondary or feed-back amplification serves a second purpose enabling the elimination of feed-back noises frequently generated when an amplifying system is used with a telephone, in which the receiver and transmitter are in relatively close proximity; such noises emanate from the loudspeaker of the system and are believed to be caused by magnetic or electro-magnetic waves fed back into the receiver from the amplifying system and leaking into the transmitter. I have found that the feed-back noises through the speaker of an amplifying system, such as described, may be eliminated by interposing, in the path of any waves passing from the receiver to the transmitter, or vice versa, on the exterior of the handpiece, means that will interrupt such waves. These interrupting means may be in the form of a filter consisting of a thin sheet of film of a non-magnetic material, preferably a non-magnetic metal, as aluminum, which is preferably disposed directly over the sound-receiving face of the transmitter. A filter so disposed is highly effective in eliminating the undesired noises, without appreciably interfering with the sound transmitting effectiveness of the amplifying system.

A desirable material for use as a filter over the mouthpiece of the instrument is aluminum-coated paper, which is of vastly greater strength than a film of aluminum itself would be, and more easily handled than such film. A disc, 116, of aluminum-coated paper, or the like, may be applied directly to the mouthpiece shield of the handpiece, as by coating the outer surface of the paper layer thereof with a pressure adhesive or, for even more improved results, may comprise the top wall of a cap, 118, which is removably fitted over the mouthpiece or transmitter 96 of the instrument. The filtering effect of such cap 118 is enhanced if the disc 116 is supported in slightly spaced relation to the perforated plate that generally serves as a cover for the mechanism of the transmitter section.

To make for convenient use of the device of the invention by either right-handed or left-handed persons, the handpiece supporting gooseneck of the unit may be adjustably supported on the base plate 12. In one embodiment, as illustrated in FIGS. 1 and 2 of the drawings, the base plate 12 supports, along each longitudinal edge thereof, a preferably inwardly-facing channel member, 120, of rectangular cross-section. The gooseneck-supporting bar 74 is provided on its free end with a rectangular block, 119, secured to its underside, in preferably normal relation thereto, which block is adapted to fit snugly and slidably within either of the channel members 120. The underside of the bar 74 also carries a second block or plate 121, parallel to block 119, and spaced a distance therefrom to accommodate the thickness of a channel member wall. By this means the bar 74 and the handpiece support may be mounted on the base 12 on either side thereof, by inserting the block 119 into the channel members on that side, with the guide-block 121 on the exterior of the channel member. To permit such insertion, suitable slots, 124, may be formed in the side walls 16 of the cover 14 of the platform 10.

Figure 7:
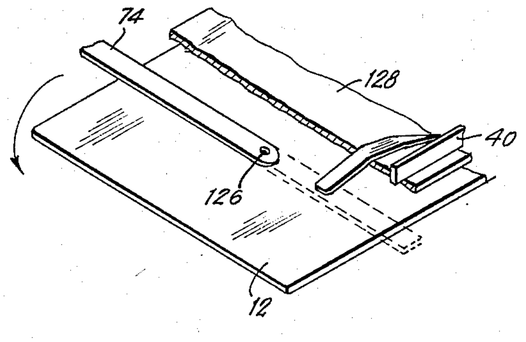
FIG. 7 is a fragmentary, perspective view of the base plate of the platform of the device, showing modified means for mounting the handpiece supporting arm on the base plate of the platform.
Figure 4:
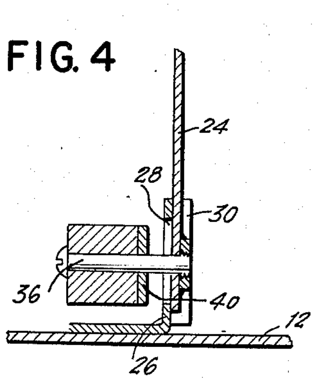
FIG. 4 is a section taken on line 4—4 of FIG. 3.
Figure 6:
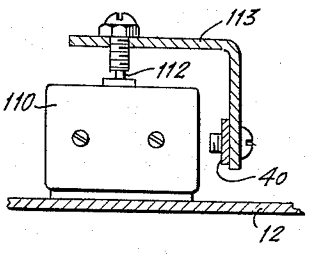
FIG. 6 is a section taken on line 6—6 of FIG. 2.
Figure 8:
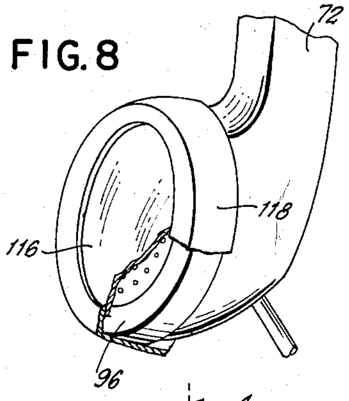
FIG. 8 is a fragmentary, perspective view, on an enlarged scale, of the transmitter end of a handpiece shown with feed-back sound damping means mounted thereon; the latter shown partly broken away.
Figure 9:
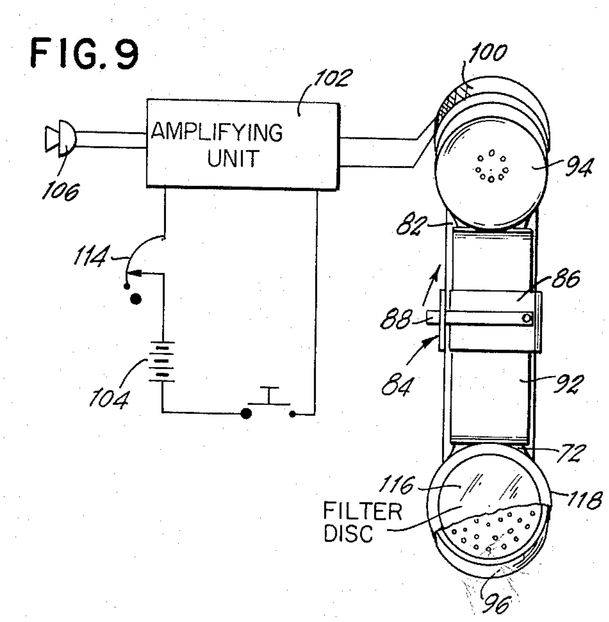
FIG. 9 is a diagrammatic view of the amplifying circuit through the device of the invention, shown as associated with a handpiece mounted on the support therefor.
Figure 3:
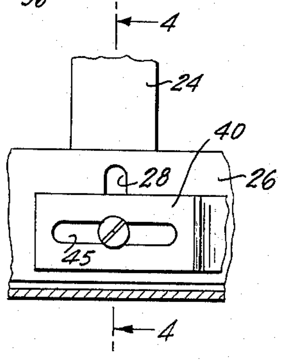
FIG. 3 is a section taken on line 3—3 of FIG. 2.

In another embodiment of the invention, illustrated in FIG. 7 of the drawings, the bar 74 is pivoted, as at 126, at the longitudinal center of the base plate 12 and at a distance from its forward end, and the cover is provided with a suitable corresponding slot formed at its forward end, permitting the rotation of the bar 74 about its pivot 126, from one side of the platform to the other. In this embodiment, a false bottom or platform, 128, may be provided on which the various members of the switch control mechanism and of the amplifying system control means may be mounted.

While the ends of levers 52 and 62 may be manipulated through suitable openings provided in the top wall of the platform 10, I prefer to have buttons, 51 and 61, connected to the ends of said levers, to project through the platform cover 14 for manipulating said levers and to give the device a decorative and ornamental appearance.

This completes the description of the telephone instrument control units of the present invention. It will be apparent that such units are compact and of ornamental appearance, and they are highly suitable and effective for the purpose intended, namely; the convenience of the user in the use of his desk space and of his hands and head in the course of using the instrument.

While the device of the invention has been illustrated and described as having the switch control mechanism and the amplifying system components disposed in a hollow stand on top of which the instrument base is supported, it may here be stated that such mechanism and components may be housed in a hollow body that is disposed adjacent or alongside of the instrument base.

It may here also be stated that numerous modifications and variations in the telephone instrument control units of the present invention may be made by anyone skilled in the art, in accordance with the principles of the invention hereinabove set forth, and without the exercise of any inventive ingenuity. I desire, therefore, to be protected for any and all such modifications and variations that may be made within the spirit of the present invention and scope of the claims hereto appended.

What I claim is:

1. A device for controlling a telephone instrument, said instrument including a base having the main circuit switch of the instrument disposed therein, and a handpiece, including the receiver and transmitter sections of the instrument, said main switch having spring-tensioned means normally maintaining the same in closed position, said spring-tensioned means including elements projecting from said base and depressible for opening said switch, comprising, in combination, a member overlying said projecting elements, means, including a lever, movably supporting said member for vertical reciprocation over said projecting elements in and out of projecting element-depressing position, automatic means for moving said lever to dispose said member in one of said positions, said lever manually operable for disposing said member in the other of said positions; supporting means for said handpiece comprising a base, an arm supported on said base, means at the free end of said arm removably supporting said handpiece, and sound-amplifying means including an induction element, an electronic amplifying unit and a speaker, said induction element, said amplifying unit and said speaker connected in circuit to a source of electric power, means mounting said induction element on said arm in proximity to said receiving section of a handpiece supported thereon, and a switch in said amplifier circuit, said switch arranged to be opened by said lever when said lever is moved to move said member into main switch-opening position and to be closed when said lever moves said member into switch-closing position.

2. The device of claim 1, wherein the means at the free end of said arm for supporting a handpiece thereon comprise a U-shaped bracket secured at said end of said arm by the web portion thereof, said bracket having its leg portions outwardly extending and spaced to receive the stem of the handpiece therebetween, one of said leg portions having a closure member hinged thereto adapted to span the space between said legs, and cooperating means between said closure member and the other of said bracket legs for releasably interengaging the same.

3. The device of claim 2, wherein said induction element is mounted on said handpiece-supporting means.

4. The device of claim 1, wherein means are provided for inhibiting induced non-vocal sounds on said instrument, said means comprising a film of non-magnet material, and means supporting said film over the outer face of said transmitting section of said handpiece.

5. The device of claim 1, wherein said induction element constitutes a coil and is arranged in proximity to the back side of said receiving section.

6. The device of claim 1, wherein said arm is adjustable and wherein said induction element is disposed on said arm in proximity to the back of said receiving section and away from the front thereof.

7. In a telephonic instrument, including receiver and transmitter sections, said instrument having sound-amplifying means associated therewith, including an electronic amplifying unit, an induction element, and a loudspeaker, said amplifying unit connected to a source of electric power, and said induction element disposed adjacent said receiver section, means for inhibiting induced non-vocal sounds through said loudspeaker comprising a film of non-magnetic metal held on said transmitting section in close proximity to the sound-receiving face thereof.

8. The apparatus of claim 7, wherein said film is laminated with a thin sheet of non-metallic material and means holding said sheet over said sound-receiving face of said transmitter in slightly spaced relation thereto.

9. A device for use in association with the transmitter section of a telephone instrument, said instrument including a receiver section and a sound-amplifying system including an induction element disposed adjacent said receiver section, an electronic sound-amplifying unit connected to a source of electric power and a loudspeaker connected to said sound-amplifier, for inhibiting induced non-vocal sounds on the loudspeaker through said transmitter section, said device comprising a film of non-magnetic metal and a flange secured to the periphery of said sheet forming a cup-shaped body adapted to fit over said transmitter.

10. A device for controlling a telephone instrument, said instrument including a base having the main circuit switch of the instrument disposed therein, and a handpiece, including the receiver and transmitter section of the instrument, said main switch having spring-tensioned means normally maintaining the same in closed position, said spring-tensioned means including elements projecting from said base and depressible for opening said switch, comprising, in combination, a platform adapted to be rested on a surface for supporting said telephone instrument base, said platform including a base plate, means associated with said base plate for controlling said main switch, said main switch-controlling means including, in combination, a member overlying said projecting elements, means, including a lever, movably supporting said member for vertical reciprocation over said projecting elements in and out of projecting element-depressing position, automatic means for moving said lever to dispose said member in one of said positions, said lever manually operable for disposing said member in the other of said positions; releasable means mounted on said base plate engaging said lever to maintain it in said other position; supporting means for said handpiece comprising a post including a flexible portion, means supporting said post on said base plate, means at the free end of said arm removably supporting said handpiece; and sound-amplifying means, including an induction element, an electronic amplifying unit, and a speaker, said induction element, said amplifying unit, and said speaker connected in circuit to a source of electric power, means mounting said induction element in proximity to said receiving section of said handpiece when said handpiece is supported on said arm, a switch in said amplifier circuit mounted on said base plate, and means associated with said switch and said lever to open said amplifier circuit switch when said lever moves to main switch-opening position and to close said amplifier circuit switch when said lever moves said main switch into closing position.

11. The device of claim 10, wherein the means supporting said post on said base plate comprises a bar connected by one end to an end of said post, and means selectively supporting said bar on said base plate to either of two sides thereof.

12. A device for controlling a telephone instrument, said instrument including a base having the main circuit switch of the instrument disposed therein, and a handpiece, including the receiver and transmitter sections of the instrument, said main switch having spring-tensioned means normally maintaining the same in closed position, said spring tensioned means including elements projecting from said base and depressible for opening said switch, comprising, in combination, a member overlying said projecting elements, means including a lever movably supporting said member for vertical reciprocation over said projecting elements into and out of projecting-element depressing position, automatic means for moving said lever to dispose said member in one of said positions, said lever manually operable for disposing said member in the other of said position, an arm, means supporting said arm at one end thereof, means at the other end of said arm removably supporting said handpiece with the sound-receiving side of the transmitting section of said handpiece unobstructedly facing a user, and sound amplifying means including an induction element, said induction element mounted at the other end of said arm substantially against the back of the receiving section of said handpiece supported on said arm.

13. In a telephone instrument-controlling device, of the character described, said telephone including a base and a handpiece removably supportable on said base, means independent of said base for removably supporting said handpiece with the sound-receiving side of the transmitting section of said handpiece unobstructedly facing a user, sound-amplifying means, including an induction element, an electronic amplifying unit and a speaker, said induction element, said amplifying unit, and said speaker connected in an electric circuit, means on said independent supporting means mounting said induction element substantially against the back of the receiving section of said handpiece and means for automatically opening and closing the circuit through said amplifying unit when the main telephone circuit is opened and closed.

14. The device of claim 13, wherein said independent handpiece-supporting means is adjustable.

15. A device for controlling a telephone instrument, said instrument including a base having the main circuit switch of the instrument disposed therein, and a handpiece, including the receiver and transmitter sections of the instrument, said main switch having spring-tensioned means normally maintaining the same in closed position, said spring-tensioned means including elements projecting from said base and depressible for opening said switch, comprising, in combination, a member overlying said projecting elements, means including a lever movably supporting said member for vertical reciprocation over said projecting elements into and out of projecting-element depressing position, automatic means for moving said lever to dispose said member in one of said positions, said lever manually operable for disposing said member in the other of said positions, an arm, means supporting said arm at one end thereof, means at the other end of said arm removably supporting said handpiece, sound amplifying means including an induction element mounted at the other end of said arm in proximity to the receiving section of a handpiece supported on said arm, and a switch connected in the circuit of said amplfying means, said switch arranged to be opened by said lever when said lever is moved to move said member into main switch-opening position and to be closed when said lever moves said member into switch-closing position.

16. A device for controlling a telephone instrument, said instrument including a base having the main circuit switch of the instrument disposed therein, and a handpiece, including the receiver and transmitter sections of the instrument, said main switch having spring-tensioned means normally maintaining the same in closed position, said spring-tensioned means including elements projecting from said base and depressible for opening said switch, comprising, in combination, a base, said instrument base supported on said base, a member overlying said projecting elements, means including a lever movably supporting said member for vertical reciprocation over said projecting elements into and out of projecting element depressing position, automatic means for moving said lever to dispose said member in one of said positions, said lever manually operable for disposing said member in the other of said positions, an arm supported by one end thereof on said base, means at the other end of said arm removably supporting said handpiece, and sound amplifying means including an induction element mounted at the other end of said arm in proximity to the receiving section of a handpiece supported on said arm.

References Cited by the Examiner

UNITED STATES PATENTS

| | | | |
|---|---|---|---|
| 2,507,375 | 5/50 | Hartwell et al. | 179—180 |
| 2,702,836 | 2/55 | Duncan | 179—148 |
| 2,852,627 | 9/58 | Schenkel | 179—180 |
| 2,901,553 | 8/59 | Stone | 179—148 |
| 2,961,498 | 11/60 | Snow | 179—148 |
| 2,997,544 | 8/61 | Ando | 179—1 |

FOREIGN PATENTS

| | | |
|---|---|---|
| 343,625 | 2/31 | Great Britain. |
| 540,975 | 3/56 | Italy. |
| 1,132,430 | 3/57 | France. |

ROBERT H. ROSE, *Primary Examiner.*

L. MILLER ANDRUS, THOMAS B. HABECKER, *Examiners.*